United States Patent
Pettygrove et al.

(10) Patent No.: US 12,009,871 B2
(45) Date of Patent: *Jun. 11, 2024

(54) TEST INSTRUMENT FOR 5G CPE ANTENNA INSTALLATION

(71) Applicant: VIAVI SOLUTIONS INC., Chandler, AZ (US)

(72) Inventors: Scott Roy Pettygrove, Leesburg, VA (US); Hans Joerg Wolf, Woodbine, MD (US); Karthik Subramanian, Germantown, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,302

(22) Filed: Jan. 18, 2023

(65) Prior Publication Data

US 2023/0231634 A1    Jul. 20, 2023

Related U.S. Application Data

(63) Continuation of application No. 16/997,506, filed on Aug. 19, 2020, now Pat. No. 11,588,561.

(Continued)

(51) Int. Cl.
| | |
|---|---|
| *H04B 17/10* | (2015.01) |
| *G08B 7/06* | (2006.01) |
| *G10K 15/04* | (2006.01) |
| *H04L 12/10* | (2006.01) |
| *H04R 3/00* | (2006.01) |
| *H04S 1/00* | (2006.01) |

(52) U.S. Cl.
CPC ............. *H04B 17/101* (2015.01); *G08B 7/06* (2013.01); *G10K 15/04* (2013.01); *H04L 12/10* (2013.01); *H04R 3/00* (2013.01); *H04S 1/007* (2013.01); *H04R 2420/07* (2013.01)

(58) Field of Classification Search
CPC ....... H04B 17/10; H04B 17/101; H04L 12/10; G08B 7/06; G10K 15/04; H04R 3/00; H04R 2420/07; H04S 1/00; H04S 1/007
See application file for complete search history.

(56) References Cited

U.S. PATENT DOCUMENTS

| | | | |
|---|---|---|---|
| 2014/0309549 A1* | 10/2014 | Selig | A61B 5/123 600/559 |
| 2020/0084645 A1* | 3/2020 | Jones | H04W 24/00 |
| 2021/0051491 A1* | 2/2021 | Zhang | H04W 24/08 |

* cited by examiner

*Primary Examiner* — Tuan H Nguyen
(74) *Attorney, Agent, or Firm* — Mannava & Kang, P.C.

(57) ABSTRACT

Disclosed are a test instrument and testing methods for audibly providing signal metrics (such as signal strength and/or signal quality) of fifth-generation network (5G) beams to assist installation of 5G Customer Premises Equipment (CPE) antenna at a premises. A test instrument may obtain signal metrics and provide audio output based on the signal metrics at various locations of the premises. The audio output may be transmitted to a headphone device worn by a user or a speaker. In this manner, the user may select an appropriate location on the premises at which to install the 5G CPE antenna via audible queues that are based on the measured signal metric at a given location. The test instrument may provide fine-tuning capabilities by also audibly providing directional information that indicates where the 5G CPE antenna should be pointed or moved to align the 5G CPE antenna to a 5G beam.

20 Claims, 8 Drawing Sheets

Related U.S. Application Data

(60) Provisional application No. 62/896,962, filed on Sep. 6, 2019.

TEST INSTRUMENT FOR 5G CPE ANTENNA INSTALLATION

RELATED APPLICATIONS

This application is a Continuation of commonly assigned and co-pending U.S. patent application Ser. No. 16/997,506, filed on Aug. 19, 2020, which claims priority to U.S. provisional patent application Ser. No. 62/896,962, which was filed on Sep. 6, 2019, the content of which are incorporated herein by reference in their entireties.

TECHNICAL FIELD

The disclosure relates to measuring fifth-generation (5G) network beam signals and in particular to audibly providing signal metrics of 5G beams and directional information to align to the 5G beams.

BACKGROUND 5G network technology provides scale, low latency, speed, and other benefits to service ever-growing network traffic volume. To build out the 5G network, 5G service providers may need to install new 5G equipment quickly while keeping the service technician safe and maintaining high Quality of Service for the customer. To install new 5G service at a customer's premises, outdoor 5G antenna installations may be required to receive 5G beams from a 5G base station. However, outdoor 5G antenna installations may present high safety risk for a service technician since such installation may require carrying heavy equipment on a ladder, rooftop, or other hazardous location. Thus, it may be dangerous for the technician to interact with testing equipment designed to be handheld while attempting to install or carry the heavy equipment. These and other hazards may also apply when troubleshooting or repairing existing installations as well. As such, what may be needed is an ability to facilitate installation or repair of outdoor 5G antennas in a safe manner that also ensures both efficient execution of the task and high Quality of Service to the end-user.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
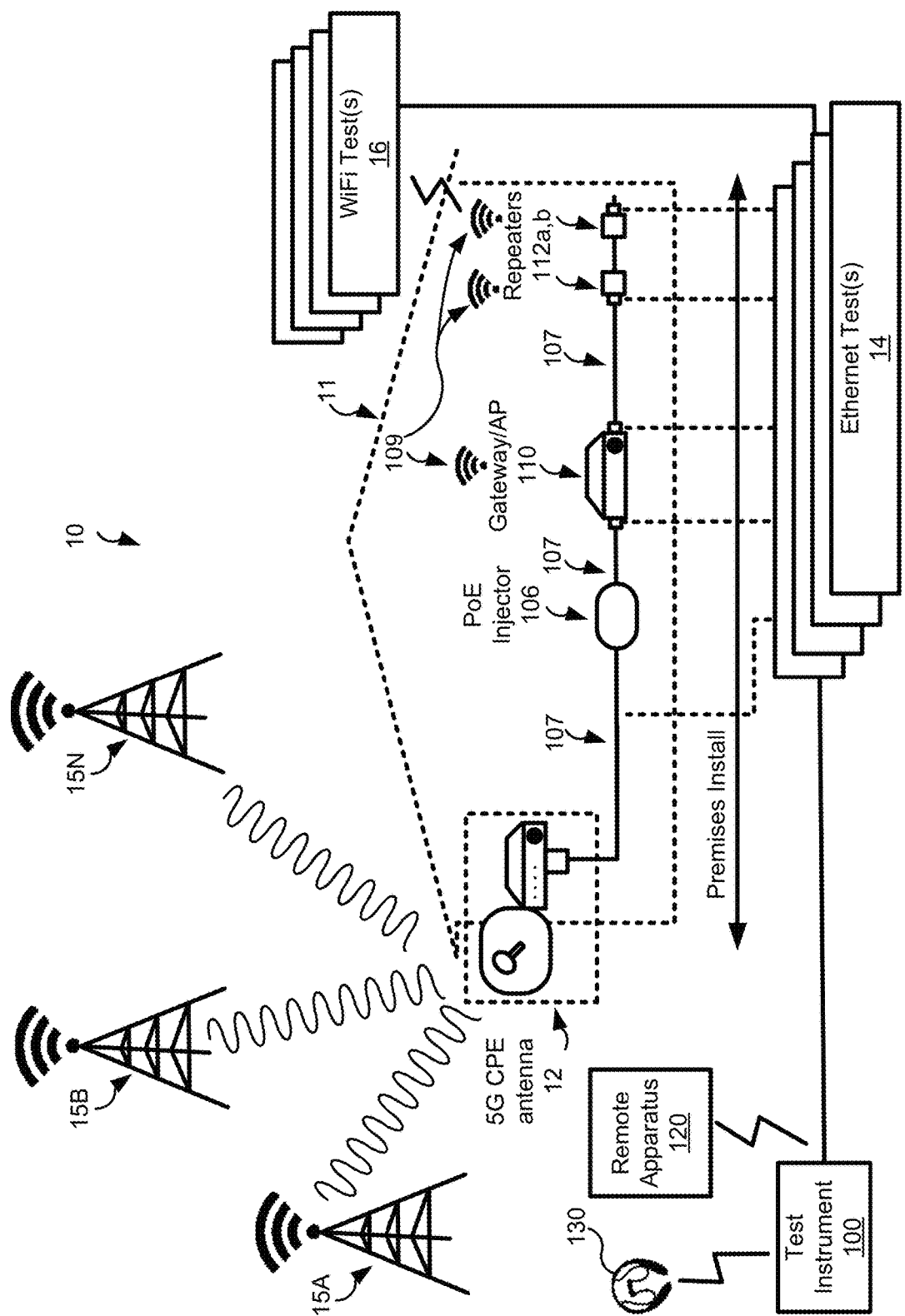
FIG. 1 is a schematic diagram of a 5G service environment in which a test instrument may measure signal strengths of 5G beams, according to an example of the disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

The present disclosure provides examples of a test instrument and testing methods for accessing signal metrics of 5G beams to assist installation of a 5G Customer Premises Equipment (CPE) antenna/transceiver at a premises where 5G services are to be provided. In particular, a test instrument may measure and audibly indicate a signal strength of a 5G beam received via the 5G CPE antenna so that a user, such as a service technician, may safely identify an appropriate location of the premises to install the 5G CPE antenna. Although various examples will be described herein in the context of installation of service, the disclosure is applicable to servicing or repairing existing installed services as well.

In an example usage, the user may carry or wear the test instrument to various candidate locations of the premises to measure signal strengths of 5G beams at the various candidate locations. The term "wear" may refer to directly attaching to a body part or attaching to clothing or material attached to a body part. The term "candidate location" may refer to a location that may be described by a geolocation at which a 5G CPE antenna may be installed, including a position describable by latitude/longitude, altitude, sea level, etc. As such, a given candidate location may include ground-level or raised location (such as on a pole). At each candidate location, the test instrument may generate audio output based on the measured signal strength. The audio output may include voice (such as voice recordings or text-to-speech), a number or pattern of audible tones that may vary as a function of the measured signal strength. The test instrument may provide the audio output to the user via a connected headphone device (such as via a Bluetooth™ or other connection), and/or a connected remote device such as a smartphone. In this manner, the measured signal strength may be conveyed to the user in a hands-free manner. In some examples, the test instrument may also (or instead) generate visual output based on the measured signal strength. The test instrument may provide the visual output to the connected remote apparatus.

After measuring signal strengths of 5G beams at one or more of the candidate locations, the user may select an appropriate location at which to install the 5G CPE antenna. For example, the test instrument may store measurement information that includes the signal metrics at each candidate location, and provide the user with the measurement information via the remote apparatus. In some examples, the test instrument may provide a recommended location based on one or more signal metrics criteria to evaluate a candidate location. Such criteria may include, for example, signal strength thresholds, signal quality thresholds, and/or other parameter that may ensure a satisfactory connection.

In some examples, the test instrument may provide fine-tuning capabilities at the selected location by providing directional information that indicates a direction where the 5G CPE antenna is to be moved (such as up/down/left/right) to align the 5G CPE antenna to a 5G beam. The directional information may be presented audibly such as through a left stereo channel to move (such as point) the 5G CPE antenna to the left or a right stereo channel to move (such as point) the 5G CPE antenna to the right. Other types of distinct audio for different directions (including up/down) may be used as well. In this manner, once a location is selected (and/or at other times), the user may use the test instrument to fine-tune the direction at which the 5G CPE antenna should be pointed to align with a beam at the selected location of the premises based on the directional information. In some examples, the test instrument may provide visual or tactile outputs of the 5G beam measurements and/or directional information in addition to or instead of the audio outputs.

After installation of the 5G CPE antenna, the test instrument may conduct service layer network testing to test 5G services provided via the 5G CPE antenna. The test instrument may conduct the service layer network testing via Ethernet links or Wireless Fidelity (WiFi or 802.11 based network) links that may use Wireless Local Area Network techniques, and/or other types of networking links (such as, without limitation Multimedia over Coax Alliance (MoCa), HomePNA Alliance (HPNA), G.hn, Power line telecommunication (PLT), etc.) to ensure satisfactory service levels are achieved. In this manner, the test instrument may be used to ensure that the location at which the 5G CPE antenna is installed on the premises is receiving a 5G beam of sufficient strength to provide appropriate levels of 5G services at the premises. Examples used herein throughout may refer to measuring 5G beams. However, the examples are provided for illustrative purposes, as the disclosure may be applied to measurements of other types of network communication signals.

FIG. 1 is a schematic diagram of a 5G service environment 10 in which a test instrument 100 may measure signal strengths of 5G beams, according to an example of the disclosure. The 5G service environment 10 may include various communication layers (such as physical layers and network layers) and types of communication links over which various devices of the 5G service environment 10 facilitate provision of the network services to a customer's premises 11 (referred to hereinafter as premises 11, which may be residential, business, commercial, etc.). For example, the 5G service environment 10 may include various types of links such as an electrical (such as Ethernet) cable 107 (also referred to as an Ethernet link 107 herein) and wireless links 109 (such as a WiFi signal). The 5G service environment 10 may communicate with a 5G network via a 5G beam from one of a plurality of 5G base stations 15 (illustrated as 5G base stations 15A-N). The premises 11 may have installed therein various types of devices, which may be connected to one another via the links. The devices may facilitate provision of the 5G services to the premises 11.

For example, the devices installed at premises 11 may include a 5G CPE antenna 12 (which may include a 5G transceiver), a Power over Ethernet (PoE) injector 106, a gateway/access point (AP) 110 (hereinafter, "gateway 110" for convenience), and one or more repeaters 112 (illustrated as repeaters 112a, b). In some examples, upon placement and installation of the 5G CPE antenna 12, the test instrument 100 may execute testing operations through various ones of the links and devices of the 5G service environment 10, enabling localization of any problems within the 5G service environment to ensure that the 5G CPE antenna 12 was installed at an appropriate location. It should be noted that the 5G CPE antenna 12 may integrate a 5G transceiver as shown in FIG. 1. However, in some examples not illustrated in FIG. 1, the 5G CPE antenna and the 5G transceiver may be separate devices, in which case the 5G CPE antenna may be connected to the 5G transceiver via a coaxial link carrying an RF signal that is de-modulated by the 5G transceiver. In these examples (not illustrated) the 5G transceiver may be connected to the PoE injector via Ethernet link 107.

The 5G CPE antenna 12 may receive 5G beams from one or more 5G base stations 15 (which are also referred to as 5G towers). Each 5G base station 15 may include a plurality of "massive" multiple input, multiple output (massive MIMO) antenna elements (in some instances, hundreds) that transmit a plurality of 5G beams, thereby enabling simultaneous communication with a high number of receiver devices. The 5G base stations 15 may implement beam-forming in which an optimal transmission route for a 5G beam is calculated for a given receiver. A 5G receiver may participate in beam-forming by enhancing or reducing sensitivity to the 5G beam and/or having an antenna of the 5G receiver positioned to align more fully with the 5G beam.

The 5G CPE antenna 12 may be installed at a location and positioned in an orientation (such as being pointed to a given direction) to receive (such as align to) a 5G beam based on signal strength measurements determined by the test instrument 100. The 5G transceiver (which may be integrated within the 5G CPE antenna 12 as illustrated) may decode 5G signals of a 5G beam received at the 5G CPE antenna 12 from a 5G base station 15 and encode Ethernet signals to 5G signals for transmission to the 5G base station 15 via the 5G CPE antenna 12. In some examples, the 5G transceiver may include a GigE interface that may receive the decoded 5G signals and encode Ethernet signals for transmission to the gateway 110. Likewise, the GigE interface may transmit Ethernet signals for transmission through the 5G transceiver. The PoE injector 106 may provide power through the Ethernet link 107 to the 5G CPE antenna 12.

To install the 5G CPE antenna 12, a user may carry or wear the test instrument 100 and a remote apparatus 120 and/or headphone device 130. The headphone device 130 may include a speaker component (such as left and right headphones), a microphone to receive audio from the user, and/or other components. The remote apparatus 120 may include various components such as a display such as a touchscreen, a speaker, a microphone, and so forth. In some examples, the remote apparatus 120 may be configured as an augmented reality or mixed reality capable device in which visual indications of the signal metrics and/or directional information described herein may be provided as AR/MR overlays. In these examples, safety and information conveyance may be enhanced by the AR/MR display, which may supplement or replace the audio indications described herein.

The test instrument 100 may connect to the 5G CPE antenna 12 to obtain signal metrics (such as signal strengths and/or signal quality indicators) of 5G beams at various locations of the premises 11. To obtain the signal metrics, the test instrument 100 may gather one or more of the signal metrics from the 5G CPE antenna 12 and/or may measure one or more of the signal metrics. As will be described in more detail herein, the test instrument 100 may audibly indicate the obtained signal metrics so that the user may identify a location at which to install the 5G CPE antenna 12 in a hands-free manner. Such audible indications may be provided to the user via audio output from the test instrument 100 to an onboard audio device such as a speaker, a remote audio device such as the headphone device 130 and/or the remote apparatus 120. In some examples, the test instrument 100 may provide visual outputs based on the measured signal strengths as well. In some examples, the test instrument 100 may provide other audio outputs that provide directional information to align the 5G CPE antenna 12 with a 5G beam to enhance beam-forming, which may increase signal strength and reduce background noise.

After the 5G CPE antenna 12 is installed (whether permanently or temporarily for testing), the test instrument 100 may conduct various network service tests (such as Internet speed tests) to ensure that 5G service is being appropriately provided to the premises 11. For example, the test instrument 100 may conduct Ethernet tests 14 at various devices such as at the GigE interface of the 5G transceiver, the gateway 110, and the repeaters 112 via Ethernet links 107. The test instrument 100 may conduct WiFi tests 16 at various locations of the premises 11 via wireless links 109, and/or at other locations within the premises network. The foregoing service testing may enable troubleshooting of problems with 5G service provided to the premises 11, whether such service is newly installed or an existing service that is experiencing problems.

Figure 2A:
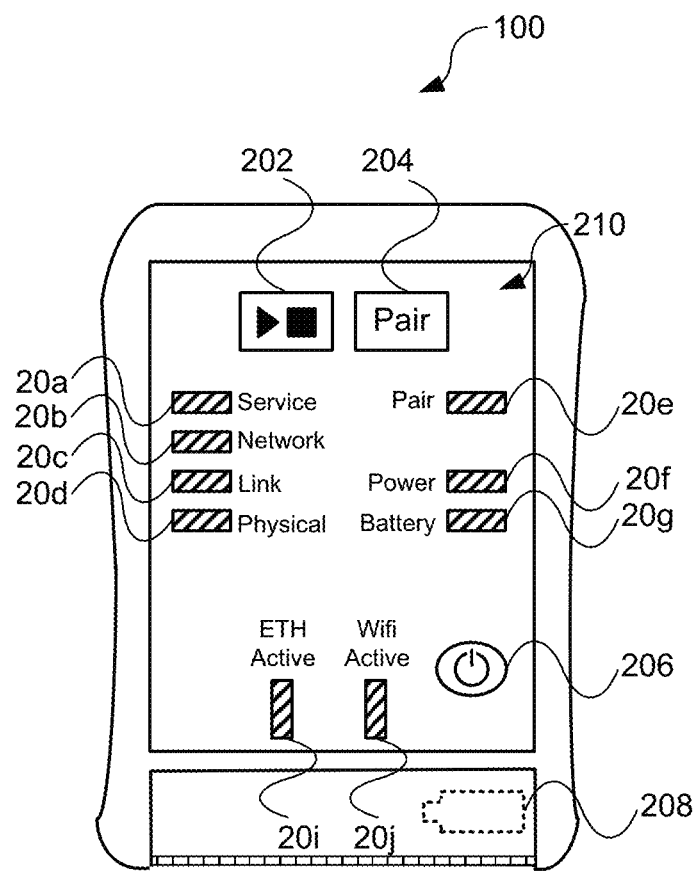
FIG. 2A illustrates a top-down view of a test instrument for measuring signal strengths and testing network services in a 5G service environment, according to an example of the disclosure.
Figure 2B:
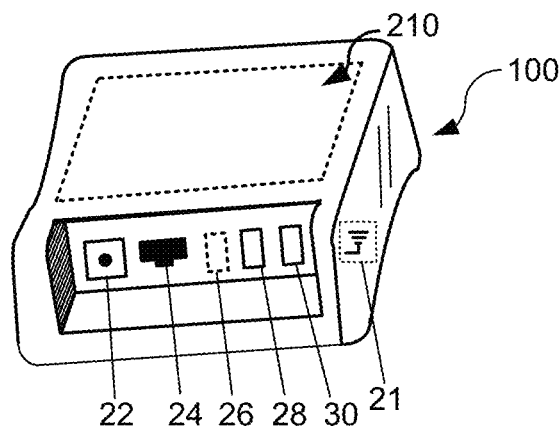
FIG. 2B illustrates a perspective view of the test instrument illustrated in FIG. 2A, according to an example of the disclosure.
Figure 3:
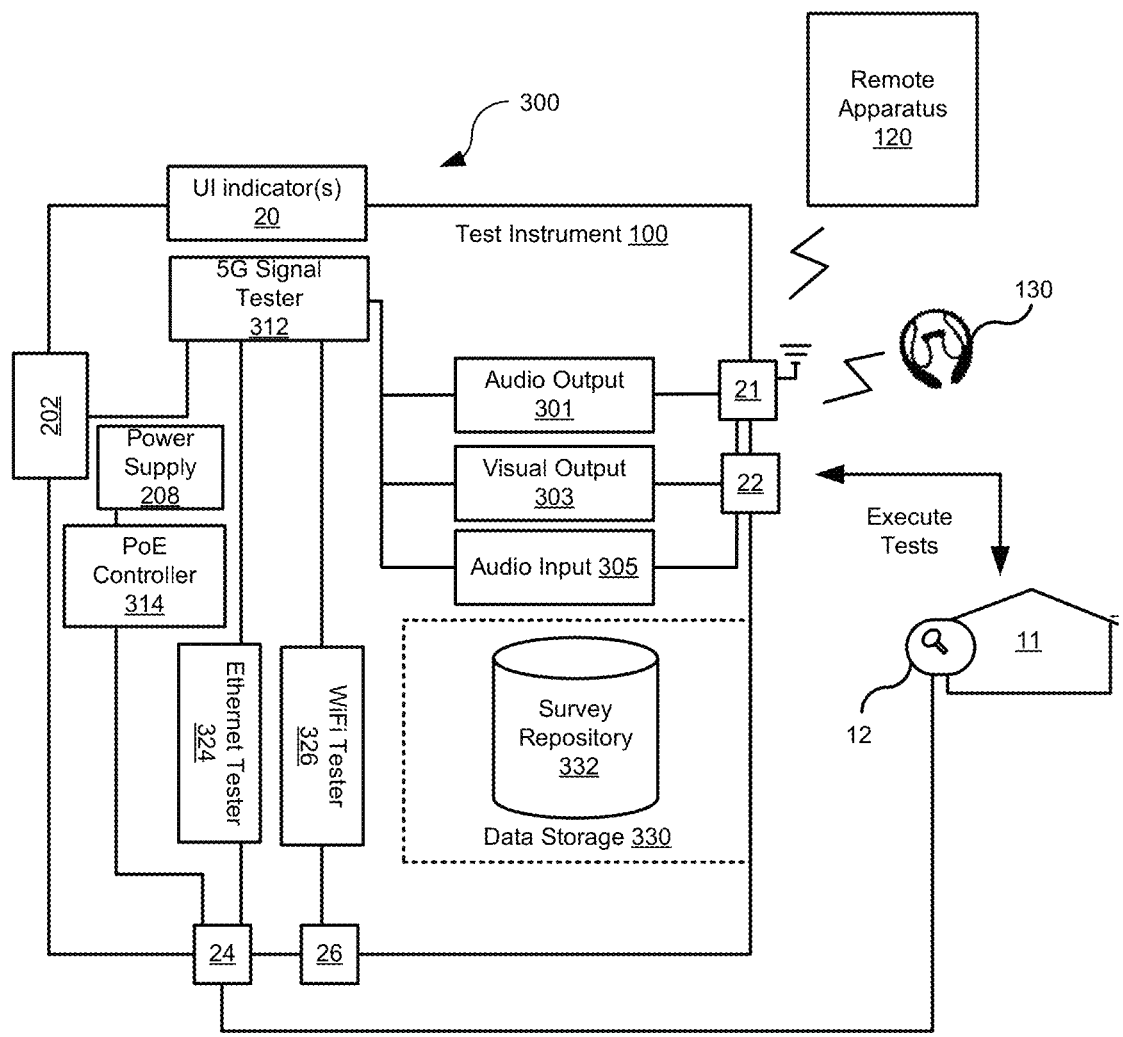
FIG. 3 illustrates a block diagram of a test instrument for measuring signal strengths and testing network services in a 5G service environment, according to an example of the disclosure.

Having described an overview of the 5G service environment 10, attention will now turn to a more detailed description of the test instrument 100 with reference to FIGS. 2a, 2b, and 3. FIG. 2A illustrates a top-down view of a test instrument 100 for measuring signal strengths and testing network services in a 5G service environment 10, according to an example of the disclosure. FIG. 2B illustrates a perspective view of the test instrument illustrated in FIG. 2A, according to an example of the disclosure. It should be noted that the appearance of the test instrument 100 and arrangement and number of features of the test instrument 100 are shown for illustrative purposes only. Other appearances and number/arrangement of the features may be used as well.

The test instrument 100 may include various input members such as input members 202, 204, and 206. Some or all of the input members 202, 204, 206 may include a hardware input member such as a button or other type of mechanical input. In other examples, some or all of the input members 202, 204, 206 may include a software input member, such as one displayed on a touch screen for examples in which the test instrument 100 includes a touch screen input device (not illustrated). Input member 202 may include a "Play" button that, when pressed, may initiate a test operation (such as from a 14 and/or 16). Input member 204 may include a "Pair" button that, when pressed, may initiate pairing with another device, such as remote apparatus 120 and/or the headphone device 130. Such pairing may be accomplished via a radio protocol such as the Bluetooth™ protocol. Input member 206 may include a power button that, when pressed, may power on or off the test instrument 100. It should be noted that although buttons are illustrated, other types of input members such as switches and other mechanical inputs, may be used. Furthermore, although mechanical input members may be used to reduce complexity and cost of the test instrument 100, software-based input members including those based on touch/capacitive screens may be used.

In some examples, the test instrument 100 may include a power supply 208 such as a battery, which may be removable. Accordingly, the test instrument 100 (and the power supply 208) in these examples may generally be portable to perform test operations throughout and outside the premises 11.

The test instrument 100 may include various user interface (UI) indicators 20 (illustrated as UI illustrated as UI indicators 20a-f). Each UI indicator 20 may include a Light Emitting Diode (LED) or other type of visual indicator to provide an indication of a state of the test instrument 100. For example, the UI indicator 20a may indicate a service layer test state. The UI indicator 20b may indicate a network layer test state. The UI indicator 20c may indicate a link layer test state. The UI indicator 20d may indicate a physical layer test state. The UI indicator 20e may indicate paired connection state. The UI indicator 20f may indicate power on/off/sleep state. The UI indicator 20g may indicate a battery level state. The UI indicator 20i may indicate an Ethernet active (Ethernet interface) state. The UI indicator 20j may indicate a WiFi active (WiFi interface) state. Each of the UI indicators 20 may be displayed differently to convey different information or states. Such differential display may include different colors, flashing, etc. Thus, as used herein, any one of the UI indicators 20 may be activated to indicate a particular state (such as test result, test progress, and other state) or other information to be conveyed to a user of the test instrument 100. In some instances, the test instrument 100 may activate combinations of UI indicators 20 to indicate a state. For example, three UI indicators 20 may be activated to remain on to indicate a first state. In another example, three UI indicators 20 may be activated to blink to indicate a second (different) state. The test instrument 100 may activate other numbers of UI indicators 20 to indicate various states as well. The various states may, in some examples, correspond to signal strength measurements of a 5G beam and/or directional information to the 5G beam.

The test instrument 100 may include various communication interfaces to connect to different types of links. For instance, the test instrument 100 may include a radio transceiver 21 such as a Bluetooth™ transceiver or other radio transceiver for wirelessly transmitting or receiving data); an audio/video (AV) interface 22 (such as a 3.5 mm headphone jack), an Ethernet interface 24 (such as an Ethernet port) to connect to the Ethernet link 107, a WiFi interface 26 (such as WiFi interface) to connect to a wireless signal from the gateway 110 and/or repeaters 112, and a wired device interface 28 (such as a Universal Serial Bus (USB) port) to connect with other devices. In some examples, the test instrument 100 may include a charging port 30 for charging the power supply 208. The charging port may include a USB port. It should be noted that the perspective view of FIG. 2B omits details of portion 210 for illustrative clarity; the details of portion 210 are illustrated in FIG. 2A.

Referring now to FIG. 3, the test instrument 100 may be a generally portable device having circuitry and data storage for measuring and outputting signal strengths of 5G beams and conducting service tests described herein. For example, the test instrument 100 may include a 5G signal tester 312, a PoE controller 314, an Ethernet tester 324, a WiFi tester 326, a data storage 330, and/or other features (including one or more of the features described with respect to FIGS. 2A and 2B). Each of the 5G signal tester 312, PoE controller 314, Ethernet tester 324, and WiFi tester 326 may include a hardware processor or other known types of control circuitry, including field programmable gate arrays, etc., for performing the operations and functions described herein. For example, the hardware processor or other known types of control circuitry may be a semiconductor-based microprocessor, a central processing unit (CPU), an application specific integrated circuit (ASIC), a field-programmable gate array (FPGA), and/or other suitable hardware device.

It should be noted that each of the foregoing may be integrated with one another. For example, the 5G signal tester 312 may be integrated with the PoE controller 314, Ethernet tester 324, and/or WiFi tester 326. The data storage 330 may include memory or any suitable computer readable storage medium for storing data and/or machine-readable instructions used by the test instrument 100. The data storage 330 may be an electrical, magnetic, optical, or other physical storage device that includes or stores executable instructions. The data storage 330 may be, for example, Random Access memory (RAM), an Electrically Erasable Programmable Read-Only Memory (EEPROM), a storage device, an optical disc, and the like. The data storage 330 may be a non-transitory machine-readable storage medium, where the term "non-transitory" does not encompass transitory propagating signals. In some examples, the data storage 330 may store a survey repository 332 that may store measurement information described herein.

An example operation of the test instrument 100 will now be described to illustrate various features of the test instrument. A user, such as a 5G service installation technician, may connect the test instrument 100 to the 5G CPE antenna 12. Such connection may be made through the Ethernet interface 24 of the test instrument 100 via an Ethernet link 207. In some examples, the PoE controller 314 may control power to be provided, from the power supply 208, to the 5G CPE antenna 12. In these examples, the test instrument 100 may supply power to the 5G CPE antenna 12. In some examples, the 5G CPE antenna 12 may be powered by other devices (not illustrated). In these examples, the test instrument 100 may not supply power to the 5G CPE antenna 12. In some of these examples, the test instrument 100 may connect to the 5G CPE antenna 12 via a radio protocol such as Bluetooth™. In some examples, the test instrument 100 may be connected to a remote audio device such as a headphone device 130 and/or the remote apparatus 120 via the radio transceiver 21 using a radio protocol such as Bluetooth™. In some examples, the test instrument 100 may be connected to the remote audio device (such as the headphone device 130 and/or the remote apparatus 120) via the AV interface 22.

The user may carry or wear the test instrument 100 and take the test instrument and the remote audio device(s) to various locations of the premises 11 (illustrated in FIG. 1) to obtain signal metrics of 5G beams received at the 5G CPE antenna 12 from the various locations. The user may use the signal metrics to identify an appropriate location at which to install the 5G CPE antenna 12. An appropriate location may be defined as a location at which a minimum threshold signal strength is available. The threshold signal strength may be predefined at a certain level. The threshold signal strength may be predefined at a level that is associated with adequate provision of 5G service (as measured through, for example, a minimum or threshold service level such as download and/or upload performance) at the premises 11. Generally speaking, signal strengths of 5G beams may range from −30 dBm to −110 dBm, with larger values (closer to zero) associated with stronger signal strengths than smaller values. In some examples, a minimum signal strength threshold such as −61 dBm may be used, although other values may be predefined instead. Values lower than the minimum threshold signal strength may be considered unusable, indicating that another location should be selected for installation of the 5G CPE antenna 12.

In some examples, a target threshold signal strength may be predefined to indicate a target level of signal strength (which may be higher than the minimum signal strength threshold). The target threshold signal strength may be predefined to be −49 dBm, although other values may be used as well. It should be noted that the location at which to install the 5G CPE antenna 12 may depend on the signal strength as well as other factors such as accessibility of the location, aesthetics, customer preferences, and so forth.

For each candidate location of the premises 11 that is to be tested, the 5G signal tester 312 may access a 5G beam received at the 5G CPE antenna 12 placed at the location. For example, the user may temporarily position the 5G CPE antenna 12 at the location to test the signal strength of any 5G beams received from 5G base stations 15 at the location.

In some examples, the 5G signal tester 312 may obtain a listing of available 5G base stations 15 at the location of the premises 11. For example, the 5G signal tester 312 may identify 5G base stations 15 for which a 5G beam is detectable through the 5G CPE antenna 12 and generate the listing of available 5G base stations. The test instrument 100 may provide the listing, such as through one of the example GUIs 500A-C illustrated in FIGS. 5A-C. The 5G signal tester 312 may access a selection of a 5G base station from among the available 5G base stations 15 at the location of the premises 11. The 5G signal tester 312 may measure the signal strength for the selected 5G base station 15 as described herein.

In some examples, the 5G signal tester 312 may obtain a listing of available beams from one or more 5G base stations 15 at the location of the premises 11. For example, the 5G signal tester 312 may identify 5G beams received at the 5G CPE antenna 12 and generate the listing of available 5G beams. The test instrument 100 may provide the listing, such as through one of the examples GUIS 500A-C illustrated in FIGS. 5A-C. The 5G signal tester 312 may access a selection of a 5G beam from among the available 5G beams. The 5G signal tester 312 may measure the signal strength for the selected 5G beam as described herein.

In some examples, the 5G base stations 15 may use beam-forming in which multiple 5G beams are transmitted to receivers. In these examples, the 5G CPE antenna 12 may receive multiple beams from multiple 5G base stations 15, in which case the 5G signal tester 312 may measure the signal strength of each beam and select the 5G beam having the strongest signal for presentation to the user. Alternatively, the 5G signal tester 312 may present a listing of beams to select (via the test instrument 100 and/or the remote apparatus 120, for example). In examples in which 5G base stations 15 do not perform beam-forming, a single 5G beam may be received from a single 5G base station 15 in which case that single 5G beam may be measured.

Whether or not beam-forming is used by the 5G base stations 15, the 5G signal tester 312 may obtain one or more signal metrics of a 5G beam received at the 5G CPE antenna 12. The 5G signal tester 312 may generate audio output 301 based on the signal strength measurement and provide the audio output 301 to the remote audio device, such as the headphone device 130 to be worn or carried by the user and/or the remote apparatus 120 to be worn or carried by the user. In this manner, the user may be notified of the signal metrics based on the audio output 301 via the remote audio device so that the user need not look divert attention (and may receive signal strength and/or signal quality indications in a hands-free audible manner) while positioning the 5G CPE antenna 12.

Various types of audio output 301 will now be described by way of examples, which are provided for illustrative purposes. Other types and combinations of audio output 301 may be provided to indicate signal metrics of 5G beams.

In some examples, the 5G signal tester 312 may vary a number of tones based on the signal metrics. For example, the audio output 301 may include a first number of tones corresponding to a first range of signal strengths and/or signal quality and a second number of tones corresponding to a second range of signal strengths and/or signal quality to audibly indicate a range of signal strength values. To illustrate, the 5G signal tester 312 may access a configurable range of values that each correspond to a particular number of tones, as listed in Table 1 below.

Table 1 provides examples of a number of tones that the 5G signal tester 312 may include in the audio output 301 as a function of the signal strength. Thresholds may likewise be used for signal quality metrics as well. Signal quality metrics may include, without limitation, a Signal to Noise Ratio (SNR), a receive power (>100 dBm and <55 dBm?), a transmit power, a Reference Signal Received Quality, a Time Division Duplex (TDD) ratio, an error vector magnitude, an adjacent channel leakage ratio, and/or other quality metrics.

| Tone Cadence | Configurable Thresholds |
|---|---|
| No tone | <=−80 dBm |
| One tone every 2 seconds | >=−80 and <−70 dBm |
| Two tones every 2 seconds | >=−70 and <−60 dBm |
| Three tones every 2 seconds | >=−60 and <−50 dBm |
| Four tones every 2 seconds | >=−50 dBm |

As illustrated in the non-limiting examples of Table 1, different numbers of tones may be included in the audio output 301 based on the signal metrics of a 5G beam measured by the 5G signal tester 312. As also illustrated, the tones may be presented at periodic intervals (every 2 seconds as illustrated in Table 1). Other numbers of tones and/or other intervals may be used as well.

Alternatively, or additionally, in some examples, the 5G signal tester 312 may vary other audio characteristics based on the signal metrics. For example, the 5G signal tester 312 may vary voice output (such as prestored voice recordings indicating whether the signal metric is acceptable or text that is output through speech-to-text), a type of the tone, a volume (magnitude) of a tone, a frequency of the tones, and so forth. These other characteristics may be provided based on the ranges (second column) of Table 1. For example, a first type of tone may be provided for a signal strength that is >=−80 and <−70 dBm. A second type of tone may be provided for a signal strength that is >=−70 and <−60 dBm. The first type of tone may sound different than the second type of tone. It should be noted that the 5G signal tester 312 may generate a specific tone when the measured signal strength meets or exceeds the minimum threshold signal strength. In some examples, the 5G signal tester 312 may generate a second specific tone when the measured signal strength is below the minimum 5G threshold signal strength. In some examples, the 5G signal tester 312 may generate yet another specific tone when the measured signal strength meets or exceeds the target threshold signal strength.

When a location for the 5G CPE antenna 12 has been selected by the user based on the measurement information, the test instrument 100 may assist the user to fine-tune the direction at which the 5G CPE antenna 12 is to be pointed at the selected location. For example, the 5G signal tester 312 may determine directional information that indicates an alignment of the 5G CPE antenna 12. The directional information may indicate whether or not the 5G CPE antenna 12 is aligned to a 5G beam and a direction in which the 5G CPE antenna 12 is to be moved to achieve an alignment with the 5G beam.

The 5G signal tester 312 may determine directional information that indicates a direction in which to move the 5G CPE antenna 12 at the location of the premises to align the 5G CPE antenna 12 with the 5G beam. Such directional information may, for example, indicate that the 5G CPE antenna 12 should be pointed left or right and/or up, or down to achieve alignment with the 5G beam based on the directional information. In some examples, the 5G signal tester 312 may provide the directional information as a second audio output 301 (separate from the audio output 301 used to audibly convey the signal metrics). In particular examples, the second audio output 301 may utilize stereo channels to convey whether the 5G CPE antenna 12 is to be directed more to the left or more to the right (with respect to the user facing the 5G CPE antenna 12). To illustrate, the 5G signal tester 312 may generate the second audio output 301 as a stereo output in which a directional tone is provided on a left stereo channel to indicate movement is to be performed in the left direction and a same or different directional tone is provided on a right stereo channel to indicate movement is to be performed in the right direction.

In some examples, for an audibly impaired user or simply to provide an additional or alternative mode of conveying signal metrics, the 5G signal tester 312 may generate a visual output 303 based on the signal metrics. In this manner, the user may be notified of the signal metrics based on the visual output 303 (and/or the audio output 301).

It some examples, the visual output 303 may include a user interface (such as one or more of the GUIS 500A-C illustrated in FIGS. 5A-C) already rendered for display at the remote apparatus 120. Alternatively, the visual output 303 may include raw signal metrics (such as in a range of −30 dBm to −110 dBm and/or quality metrics range) and other raw data for the remote apparatus 120 to use to render and display the user interface (such as one or more of the GUIS 500A-C illustrated in FIGS. 5A-C).

It should be noted that the 5G signal tester 312 may vary the audio output 301 and/or the visual output 303 dynamically based on live signal metrics of a 5G beam. For instance, as the user moves the 5G CPE antenna 12, the signal metrics from the same 5G beam may change. Alternatively, as the user moves the 5G CPE antenna 12, the 5G CPE antenna 12 may acquire another (different) 5G beam, which may have different a signal metrics. As such, the 5G signal tester 312 may dynamically generate the audio output 301 and/or the video output 303 based on live signal metrics of a 5G beam.

The foregoing signal metrics and generation of audio output 301 and/or visual output 303 may be repeated over multiple locations. Measurement information associated with the measurements may be stored in the survey repository 332. The measurement information may include an identification of a location of the premises 11 tested (such as "back right corner of the house"), an identification of a beam that was measured, an identification of a 5G base station 15 from which the beam originated, the measured signal metrics of the beam, and/or other information relating to the measurement. In this manner, the user may access the locations and respective measurement information from the survey repository 332 to select an appropriate location based on the measurement information (and, in some examples, other factors such as location accessibility).

After the 5G CPE antenna 12 has been installed at the premises 11, the test instrument 100 may conduct various service testing to ensure that the placement of the 5G CPE antenna 12 results in appropriate level of 5G services provided to the premises. For example, the test instrument 100 may conduct one or more Ethernet tests 14, one or more WiFi tests 16, and/or other types of tests.

Each of the Ethernet tests 14 and WiFi tests 16 may include a test of the physical layer, the link layer, the network layer, and the service layer, so that multiple layers of each type of connection may be characterized. The physical, link, network, and service layer tests may be specific to each of the Ethernet tests 14 and the WiFi tests 16. For example, a physical layer test included in the Ethernet tests 14 may measure a level of Ethernet traffic flowing through the Ethernet link 107 (such as an Ethernet cable). A physical layer test included in the WiFi tests 16 may measure a signal strength of the wireless link 109 from the gateway 110 or a repeater 112. Other layer tests may likewise be specific to Ethernet test 14 and WiFi tests 16 (although some layer tests may be the same throughout the Ethernet tests 14 and WiFi tests 16).

Table 2 below illustrates various layers (such as physical, link, network, and service) that are tested for the different types of tests 14 and 16. It should be noted that the profile parameters may specify any one of these tests, related data to configure or otherwise run the tests (including any WiFi or other credentials), and/or data to measure results of the tests (such as threshold values described in this disclosure).

Various data, measurements, or other conditions used to obtain results of the tests are listed in brackets ("[ ]"). For example, broadband performance may be gauged based on a speed test measurement obtained while conducting a speed test.

|  | Ethernet | WiFi |
| --- | --- | --- |
| Service | Broadband Performance Profile correct? [Speed test measurement] | Broadband Performance Profile correct? [Speed test measurement] |
| Network | Getting an IP address? Authentication access? [PPPoE, DHCP] | Getting an IP address? Authentication access? [PPPoE, DHCP] |

-continued

|  | Ethernet | WiFi |
| --- | --- | --- |
| Link | Ethernet Traffic? [Ethernet traffic LEDs] | Connected to the correct WiFi network? Correct WiFi settings? [BSSID, Security, Band] |
| Physical | Ethernet Signal? [Ethernet Traffic LEDs] | Enough WiFi Coverage in each room? [Wifi Signal Strength] |

In some examples, some or all of the Ethernet tests 14 and/or WiFi tests 16 may be encoded in and automatically executed based on programmable workflows stored at the test instrument 100. In this manner, the test instrument 100 may be pre-programmed with programmable workflows to automate some or all testing.

For example, the Ethernet tester 324 may perform one or more Ethernet tests 14 using the Ethernet interface 24 to test data communication (receive and/or transmit) via Ethernet link 107. The Ethernet tests 14 may include a physical layer test, a link layer test, a network layer test, and a service layer test. The Ethernet tests 14 may be based on signals transmitted and/or received by the Ethernet tester 324.

The Ethernet tester 324 may test the physical layer of data communication through the Ethernet link 107 by transmitting and/or receiving data through the Ethernet interface 24 and determining whether electrical (such as Ethernet) signals are being transmitted and/or received through the Ethernet interface 24. The presence of such signals may also be indicated through LED indicators (not illustrated) of the Ethernet interface 24.

The Ethernet tester 324 may test the link layer of data communication through the Ethernet link 107 based on observed Ethernet traffic across the Ethernet interface 24, similar to the manner in which the physical layer is tested for the physical layer of Ethernet links. The Ethernet tester 324 may test the network layer of data communication through the Ethernet link 107 by verifying that the test instrument 100 is able to obtain an IP address and authenticated access to the Internet via the Ethernet link 107 (from the gateway 110). The Ethernet tester 324 may test the service layer of data communication through the Ethernet link 107 by transmitting or receiving electrical signals similar to execute a speed test.

In some examples, the WiFi tester 326 may perform one or more WiFi tests 16 using the WiFi interface 26 to test data communication (receive and/or transmit) via a wireless transceiver 408 through a wireless link 109. For example, the wireless transceiver may convert Tx electrical signals 201 from the WiFi tester 326 to outgoing wireless signals and convert incoming wireless signals into Rx electrical signals for the Ethernet tester 324. The WiFi 16 may include a physical layer test, a link layer test, a network layer test, and a service layer test. The WiFi tests 16 may be based on signals transmitted and/or received by the WiFi tester 326.

The WiFi tester 326 may test the physical layer of data communication through the wireless link 109 by measuring a wireless signal strength of the wireless link 109. The measurement may be performed for each of various frequencies, such as 2.4 Ghz and 5.0 Ghz frequencies. The WiFi tester 326 may test the link layer of data communication through the wireless link 109 by determining whether the test instrument is connected to the proper wireless network (such as the correct router by verifying the BSSID of the gateway 110 to which the WiFi tester 326 is connected is the correct BSSID), verifying that the proper settings are used (such as the correct security profile/type, password, correct band, etc.), and/or verifying other wireless settings.

The WiFi tester 326 may test the network layer of data communication through the wireless link 109 by verifying that the test instrument 100 is able to obtain an IP address and authenticated access to the Internet via the wireless link 109 (from the gateway 110 and/or or a repeater 112). The WiFi tester 326 may test the service layer of data communication through the wireless link 109 by transmitting or receiving electrical signals to execute a speed test.

In some examples, service test results from service tests (such as Ethernet tests 14 and/or WiFi tests 16) conducted after the 5G CPE antenna 12 has been installed may be stored at the survey repository 332. In this manner, service test results may be stored in association with the measurement information in the survey repository 332. In some examples, some or all of the data stored in the survey repository 332 may be transmitted to a remote device or service, such as remote apparatus 120 and/or cloud platform 401.

In some implementations, the 5G signal tester 312 may receive inputs from the user via voice or audio input 305. For example, to facilitate hands-free operation of the test instrument 100, the user may speak into the microphone of the headphone device 130, which may transit the audio input 305 to the test instrument 100 via the radio transceiver 21 or the AV interface 22. The 5G signal tester 312 may use on-board Automated Speech Recognition (ASR) capabilities that convert the audio input 305 to text. The 5G signal tester 312 may use on-board Natural Language Processing (NLP) that converts the text to an intended meaning based on contextual, semantic, and/or other information for recognizing intent from text. The details of ASR and NLP are not further disclosed, as they are not pertinent to the disclosure—known ASR and NLP techniques may be used by the 5G signal tester 312. The speech recognition capabilities may further facilitate hands-free operation of the test instrument 100. It should be noted that in addition to or instead of on-board ASR and/or on-board NLP, the test instrument 100 may leverage ASR and NLP capabilities of the remote apparatus 120. In these examples, the remote apparatus 120 may receive voice inputs from the user, interpret the voice inputs to requests for the test instrument 100, and provide the requests to the test instrument 100 via the radio transceiver 21.

Block diagram 300 shown in FIG. 3 is a simplified block diagram showing only the blocks relevant for the methods of the present disclosure. Blocks elements not relevant for the methods of this disclosure are not shown, including but not limited to functional elements such as equalizers, lasers, photo receivers, wavelength multiplexers, speed-test servers, etc.

Figure 4:
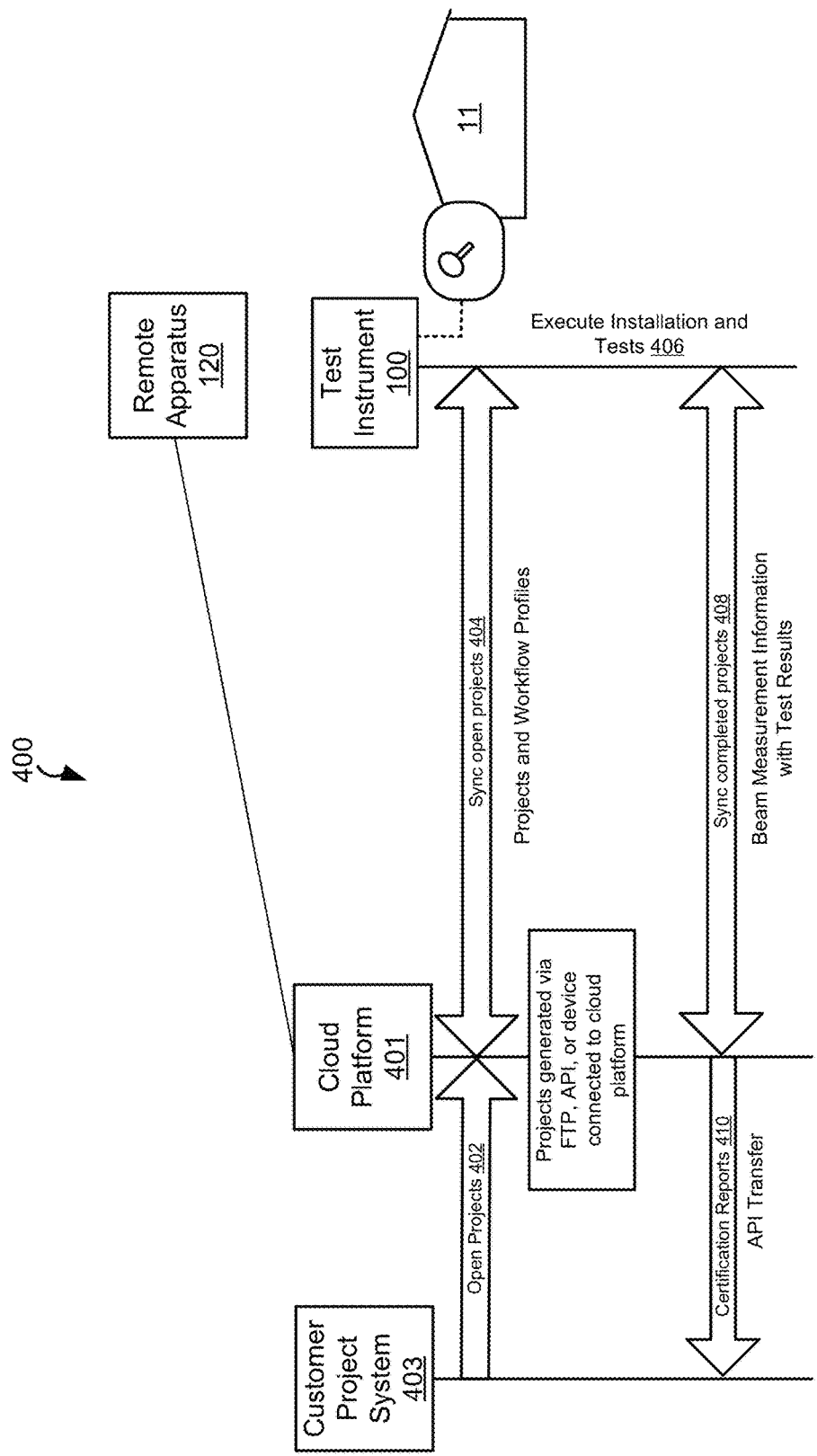
FIG. 4 is a schematic data flow diagram of reporting 5G beam measurement information and service testing information from a test instrument to a cloud platform in the 5G service environment, according to an example of the disclosure.

FIG. 4 is a schematic data flow diagram 400 of reporting 5G beam measurement information and service testing information from a test instrument 100 to a cloud platform 401 in the 5G service environment, according to an example of the disclosure. The cloud platform 401 may include networked devices that communicate with the remote apparatus 120 and/or the test instrument 100 to provide networked functionality, such as storing, retrieving, and providing test results and storing, retrieving, and providing workflows. In some examples, the test instrument 100, though independently operable of the remote apparatus 120, may be configured as a companion device to the remote apparatus 120. In this sense, the test instrument 100 may itself be considered a test instrument. In some examples, the test instrument 100 may upload test results to the remote apparatus 120 and/or the cloud platform 401. In some examples, the test instrument 100 may download workflows from the remote apparatus 120 and/or the cloud platform 401.

At 402, a project may be opened. The project may originate from a customer project system 403 that tracks new installations and existing service items. The project may be created to install 5G service for a new customer (such as a new install) or service an existing customer (such as to troubleshoot a problem) at premises 11. In some examples, a workflow profile may be generated or otherwise identified to address the project. For example, a user may use the remote apparatus 120 to specify a set of tests to confirm that new 5G service is working as expected or may include a set of tests to be able to troubleshoot a problem. In either instance, the remote apparatus 120 may generate a workflow profile based on the set of tests, which may include one or more Ethernet tests 14 and/or one or more WiFi tests 16 be conducted. The workflow profile may be custom-generated for the specific problem, based on a preconfigured template, or be a standard workflow profile that is predefined. Profiles may also include pass/fail and/or acceptance criteria for the tests stipulated within the profile. The remote apparatus 120 may share the project and/or the workflow profile via the cloud platform 401.

At 404, the cloud platform 401 may provide the project and/or the workflow profile to the test instrument 100. As such, the test instrument 100 may be pre-loaded with the project and/or the workflow profile. At 406, the test instrument 100 may generate measurement information (which may include measurements obtained at various locations of the premises) based on signal metrics such as signal strength and/or signal quality described herein and test results of tests specified in the workflow profile.

At 408, the test instrument 100 may synchronize completed projects with the cloud platform 401. For example, the test instrument 100 may upload the measurement information and/or results of testing for each project to the cloud platform 401. At 410, the cloud platform 401 may provide certification reports (such as measurement information, test results and problem resolution) to the customer project system 403. In some examples, the cloud platform 401 may provide the measurement information and test results to remote apparatus 120. In some examples, as previously noted, the test instrument 100 may share the measurement information and test results directly with the remote apparatus 120.

Figure 5A:
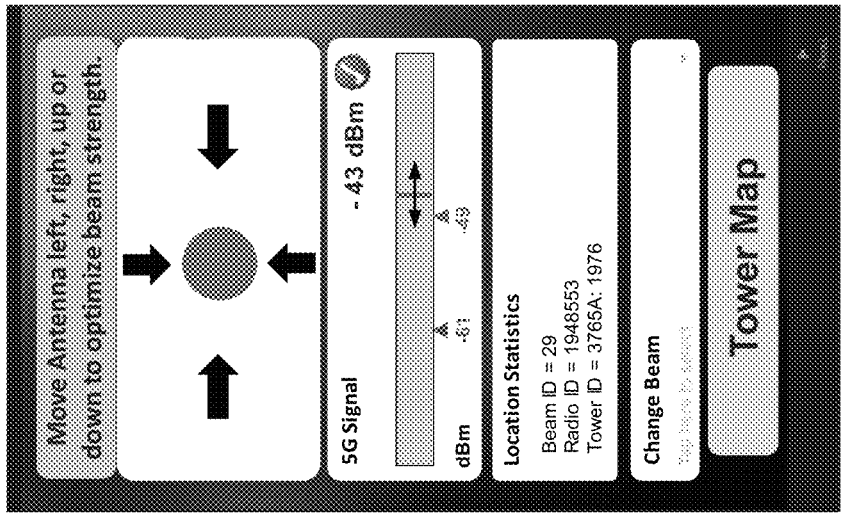
FIG. 5A illustrates a screenshot view of a graphical user interface that displays a measurement of signal strength of a 5G beam at an individual location, according to an example of the disclosure.
Figure 5B:
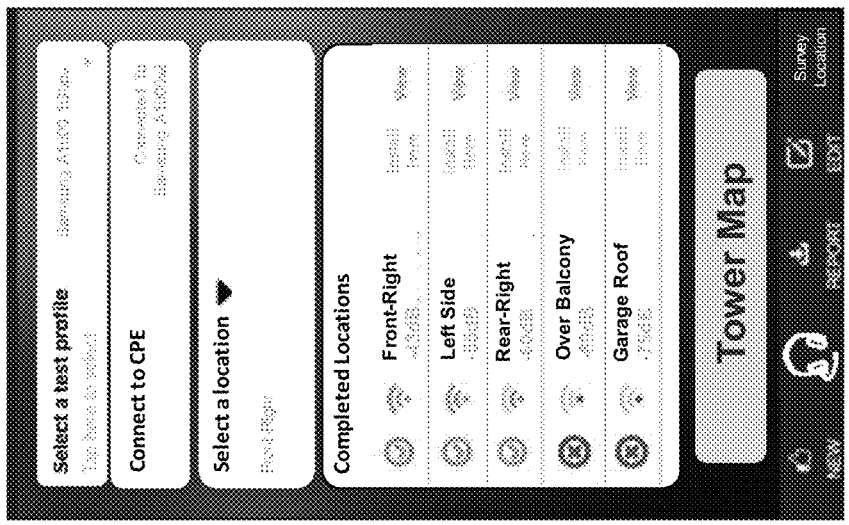
FIG. 5B illustrates a screenshot view of a graphical user interface that displays measurement information for locations at which signal strength of 5G beams were measured, according to an example of the disclosure.
Figure 5C:
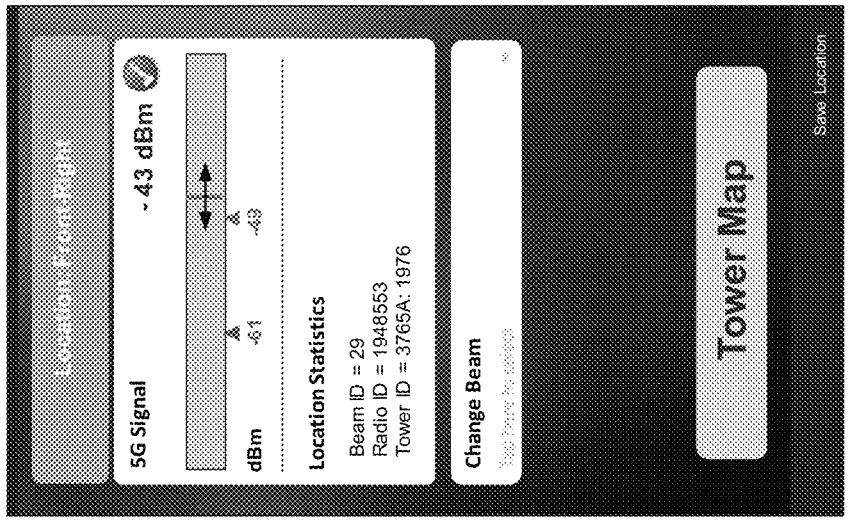
FIG. 5C illustrates a screenshot view of a graphical user interface that displays directional information to optimize signal strength of a 5G beam, according to an example of the disclosure.

FIG. 5A illustrates a screenshot view of a graphical user interface that displays a measurement of signal strength of a 5G beam at an individual location, according to an example of the disclosure. Similar displays (not illustrated) may be generated for signal quality metrics as well. Some displays (not illustrated) may include combinations of signal strength and signal quality information. FIG. 5B illustrates a screenshot view of a graphical user interface that displays measurement information for locations at which signal strength of 5G beams were measured, according to an example of the disclosure. FIG. 5C illustrates a screenshot view of a graphical user interface that displays directional information to optimize signal strength of a 5G beam, according to an example of the disclosure.

The GUIS 500A, 500B, and 500C (GUIS 500A-C) may each be provided through a remote device (such as remote apparatus 120) that is separate from the test instrument 100. In some examples, the test instrument 100 transmits the measurement information to the remote device in raw data, in which case the remote device may format the GUIs 500A-C based on the raw data according to a format usable by the remote device. In other examples, the test instrument 100 may transmit the test results in already formatted form (such as via Hypertext Markup Language (HTML) or other user interface format), in which case the remote device simply displays the formatted form.

In some examples (not illustrated), the GUIs 500A-C may each display service test results, configurations, and/or other information of some or all layers (e.g., physical layer, service layer, application layer, etc.).

Figure 6:
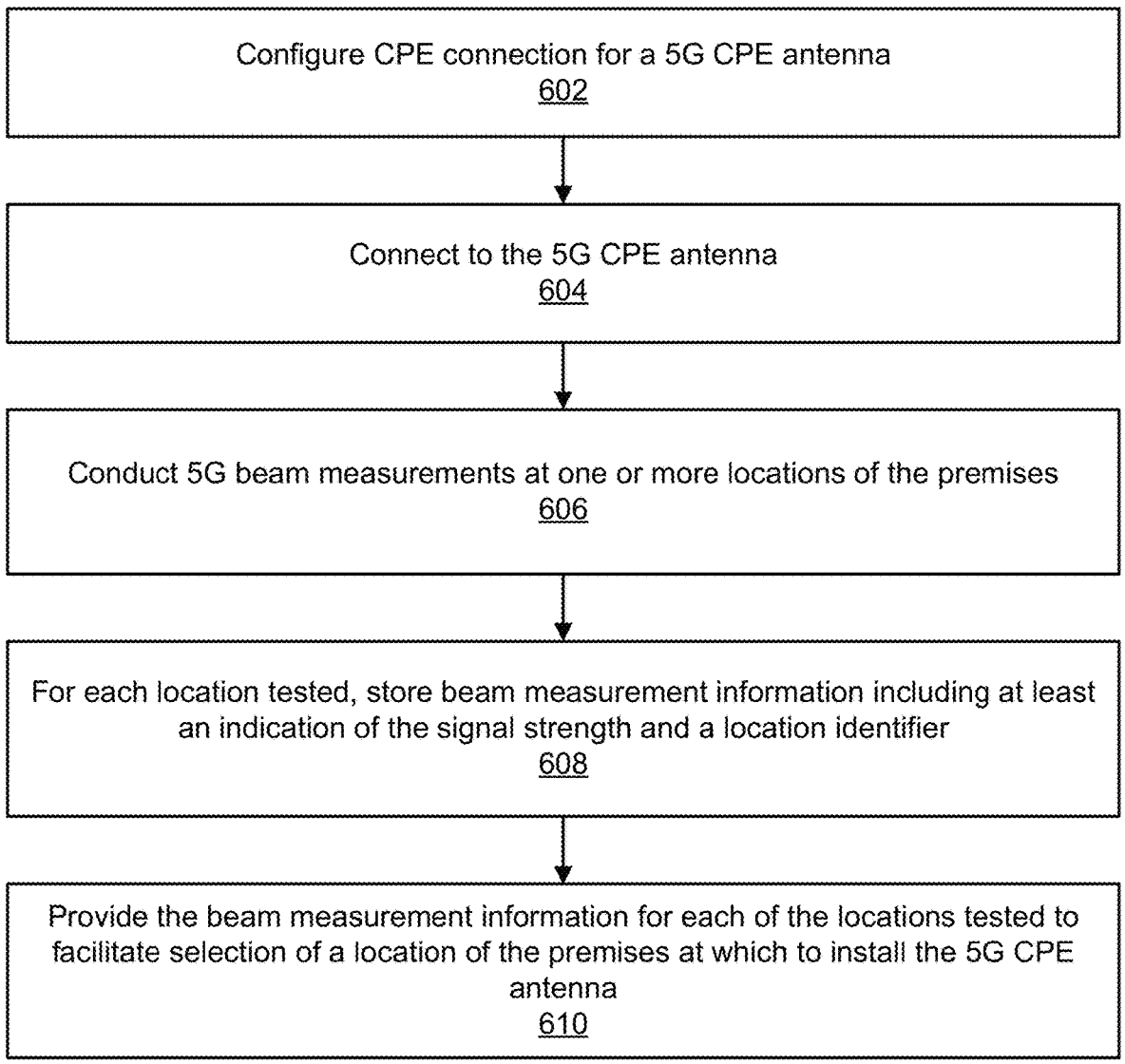
FIG. 6 illustrates a method of measuring and storing signal strengths of 5G beams at various locations of a premises, according to an example.

FIG. 6 illustrates a method 600 of measuring and storing signal metrics of 5G beams at various locations of a premises 11, according to an example.

At 602, the test instrument 100 may configure a CPE connection for a 5G CPE antenna 12. For example, a given 5G CPE antenna 12 to be installed at the premises 11 may be manufactured by one of various vendors. As such, the CPE connection to the 5G CPE antenna 12 may be configured accordingly. In some examples, the test instrument 100 may pre-store (such as in data storage 330) a profile for each of a plurality 5G CPE antennas 12. In these examples, a user may be provided with a selectable listing of profiles. In some examples, the configuration may be performed by a user via a remote apparatus 120 that displays a user interface, such as GUI 500A, for configuring the CPE connection. Selections on the user interface may be received at the test instrument 100.

At 604, the test instrument 100 may connect to the 5G CPE antenna 12 based on the configuration. In some examples, the connection may be made via Ethernet connection such that the user may plug an Ethernet cable between the test instrument 100 and the 5G CPE antenna 12. In some of these examples, the test instrument 100 may provide power to the 5G CPE antenna 12 via PoE. In some examples, the connection may be made via radio protocol, such as Bluetooth™ or WiFi.

At 606, the test instrument 100 may conduct 5G beam measurements at one or more locations. For example, the test instrument 100 may receive an identification of a candidate location of the premises 11 that the user is to survey to search for appropriate signal metrics. The location identifications may include qualitative labels such as "back right corner of the house" or more quantitative labels such as geo-coordinates or "10 feet from the front roofline." In some examples, the user may supply such location identifications or the locations may be predefined. The test instrument 100 may continue such measurement at one or more identified locations.

At 608, the test instrument 100 may store beam measurement information for each of the one or more locations such as at the survey repository 332. For instance, for each location tested, the beam measurement information may include a signal metric for each 5G beam, a 5G base station identification from which the 5G beam was transmitted, a radio identification, a location identification, and/or other information related to a measurement at a location. A located tested may refer to a location at which the 5G CPE antenna 12 is to be potentially installed.

At 610, the test instrument 100 may provide the beam measurement information for each of the locations tested to facilitate selection of a location of the premises at which to install the 5G CPE antenna 12. In this manner, the user may review the measurement information of each of the locations to identify a location at which to install the 5G CPE antenna 12. In some examples, the test instrument 100 may provide the beam measurement information to the user via a user interface, such as GUI 500B illustrated in FIG. 5B. In some of these examples, the test instrument 100 may provide the user interface already rendered and formatted for display at the remote apparatus 120. Alternatively, the test instrument 100 may provide the measurement information to remote apparatus 120 in an unformatted manner, in which case the remote apparatus 120 may format and render the user interface.

Figure 7:
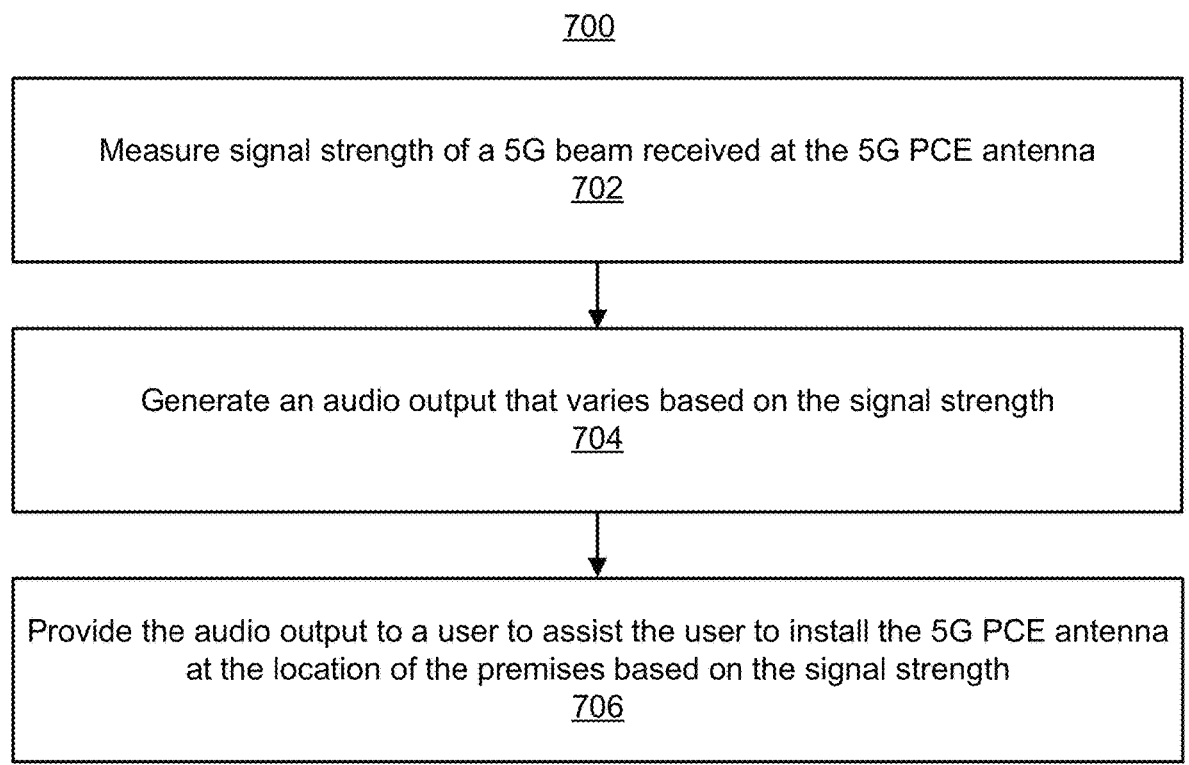
FIG. 7 illustrates a method of audibly providing a signal strength measurement of a 5G beam at a location, according to an example.

FIG. 7 illustrates a method 700 of audibly providing a signal metric measurement of a 5G beam at a location, according to an example. In some examples, the method 700 may be executed by the test instrument 100 to facilitate identification of a location at which to install a 5G CPE antenna 12.

At 702, the test instrument 100 may obtain one or more signal metrics of a 5G beam received at the 5G CPE antenna 12. At 704, the test instrument 100 may generate an audio output 301 that varies based on the signal metrics. At 706, the test instrument 100 may provide the audio output 301 to a user to assist the user to install the 5G PCE antenna at the location of the premises based on the signal metrics.

In some examples, when a location for installing the 5G CPE antenna 12 has been selected (such as based on one or both of the methods 600 and 700), the test instrument 100 may be used to fine-tune an alignment of the 5G CPE antenna 12 with a 5G beam at the selected location. It should be noted that the fine-tune alignment may be performed at other times as well, such as to help identify an appropriate location at which to install the 5G CPE antenna 12, or to service or repair existing installations.

Figure 8:
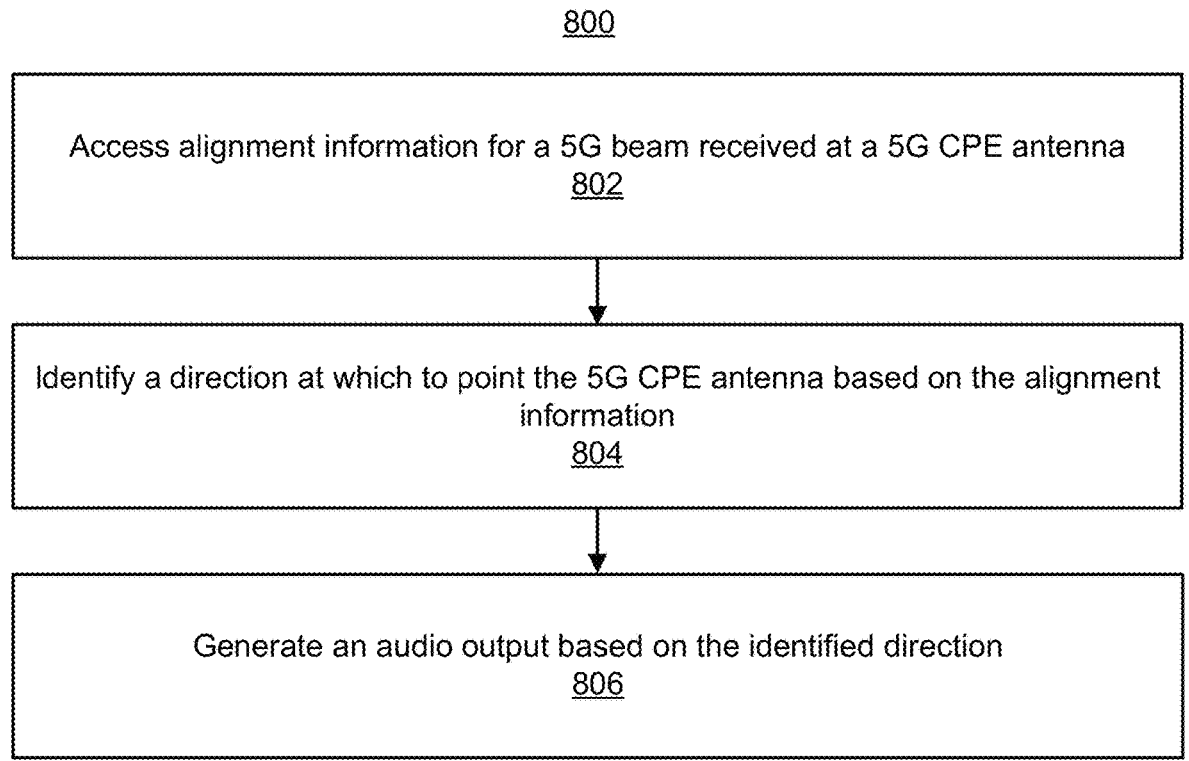
FIG. 8 illustrates a method of audibly providing directional information to fine-tune an alignment of a 5G CPE antenna to a 5G beam at a location, according to an example.

For example, the test instrument 100 may execute one or more operations illustrated in FIG. 8, which illustrates a method 800 of audibly providing directional information to fine-tune an alignment of a 5G CPE antenna 12 to a 5G beam at a location, according to an example. At 802, the test instrument 100 may access directional information for a 5G beam received at a 5G CPE antenna 12. The directional information may indicate whether the 5G CPE antenna 12 is aligned with the 5G beam. At 804, the test instrument 100 may identify a direction at which to point the 5G CPE antenna 12 based on the directional information.

At 806, the test instrument 100 may generate an audio output 301 (separate from the audio output 301 that may be generated to indicate a signal metric of the 5G beam) based on the identified direction. For example, the audio output 301 may include a distinct audio for each direction in which the 5G CPE antenna 12 should be moved/pointed. In a particular example, if the 5G CPE antenna 12 is to be pointed more to the left (relative to a user facing the 5G CPE antenna 12) to align to the 5G beam, the test instrument 100 may generate a tone or other audio on a left channel of a stereo audio connection, which may be presented to a user on a left headphone of the headphone device 130. Similarly, if the 5G CPE antenna 12 is to be pointed more to the right to align to the 5G beam, the test instrument 100 may generate the same or different tone or other audio on a right channel of the stereo audio connection, which may be presented to a user on a right headphone of the headphone device 130. It should be noted that a distinct audio for each of the left direction and right direction may be generated on both channels instead. For up/down directions, the test instrument 100 may generate similarly distinct audio that indicates up or down, on one or more audio channels.

Alternatively, or additionally, the test instrument 100 may provide the directional information visually as well. In other words, the test instrument 100 may generate visual output 303 (separate from any visual output that indicates a signal metric of a 5G beam). An example of a visual output 303 for providing directional information is illustrated in the GUI 500C as shown in FIG. 5C.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. For example, the test instrument may be used to install communication equipment other than 5G communication equipment, so long as signal metrics of those other communication equipment may be indicated audibly as described herein.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A test instrument, comprising:
   a radio transceiver to wirelessly transmit audio to a remote audio device;
   a power supply;
   a Power over Ethernet (PoE) controller to control power to be provided, from the power supply, to an external fifth-generation network (5G) Customer Premises Equipment (CPE) antenna remote from the test instrument, the 5G CPE antenna to be installed at a specific location on a premises that is to receive 5G services; and
   a 5G signal tester to:
      obtain a signal metric of a 5G beam received by the 5G CPE antenna at the specific location on the premises, wherein the signal metric varies based on a signal strength of the 5G beam received by the 5G CPE antenna depending on where the 5G CPE antenna is located on the premises;
      generate an audio output having a particular tone that varies based on the varying signal metric of the 5G beam, wherein the particular tone of the audio output indicates the signal strength of the 5G beam received by the 5G CPE antenna at the specific location on the premises; and
      transmit, via the radio transceiver, the audio output having the particular tone to the remote audio device.

2. The test instrument of claim 1, wherein to generate the audio output, the 5G signal tester is further to:
   generate a number of tones based on the varying signal metric, wherein the audio output comprises a first tone corresponding to a first range of signal metric values and a second tone corresponding to a second range of signal metric values,
   wherein the particular tone of the audio output is the first tone or the second tone.

3. The test instrument of claim 2, wherein to generate the number of tones, the 5G signal tester is further to generate the number of tones at periodic intervals.

4. The test instrument of claim 1, wherein to generate the audio output, the 5G signal tester is further to:
   generate a type of tone based on the varying signal metric, wherein the audio output comprises a first type of tone corresponding to a first range of signal metric values and a second type of tone corresponding to a second range of signal metric values,
   wherein the particular tone of the audio output is the first type or the second type of tone.

5. The test instrument of claim 1, wherein the 5G signal tester is further to:
   determine directional information that indicates a direction in which the 5G CPE antenna is turned at the specific location of the premises to align the 5G CPE antenna with the 5G beam; and
   provide the directional information as a second audio output.

6. The test instrument of claim 5, wherein the direction in which the 5G CPE antenna is turned comprises either a left direction or a right direction, and wherein the 5G signal tester is further to:
   generate the second audio output as a stereo output in which a directional tone is provided on a left stereo channel to indicate that the 5G CPE antenna is turned in the left direction and a same or different directional tone is provided on a right stereo channel to indicate that the 5G CPE antenna is turned in the right direction.

7. The test instrument of claim 5, wherein the 5G signal tester is further to provide the directional information as a visual output.

8. The test instrument of claim 1, wherein the 5G signal tester is further to provide a visual output based on the varying signal metric.

9. The test instrument of claim 8, wherein the visual output is provided to a remote apparatus connected to the test instrument.

10. The test instrument of claim 1, wherein the 5G signal tester is further to:
    obtain a listing of available 5G base stations that provide the 5G services to the premises; and
    access a selection of an available 5G base station from the list of available 5G base stations, wherein the varying signal metric is measured for 5G beam from the selected available 5G base station.

11. The test instrument of claim 1, wherein the 5G signal tester is further to:
    obtain a listing of available 5G beams from one or more 5G base stations that provide the 5G services to the premises; and
    access a selection of an available 5G beam from the list of available 5G beams, wherein the varying signal metric is measured for the selected available 5G beam.

12. The test instrument of claim 1, wherein the 5G signal tester is further to:
    receive identifications of each of a plurality of locations of the premises at which to measure signal metrics of 5G beams; and
    store respective signal metrics of the 5G beams with corresponding locations among the plurality of locations.

13. The test instrument of claim 1, wherein the remote audio device comprises a wireless headphone device or a remote apparatus.

14. The test instrument of claim 1, further comprising:
    an Ethernet tester to test, after installation of the 5G CPE antenna, the 5G services provided to the premises via the 5G CPE antenna over an Ethernet connection of the premises.

15. The test instrument of claim 1, further comprising:
a wireless fidelity (WiFi) tester to test, after installation of the 5G CPE antenna, the 5G services provided to the premises via the 5G CPE antenna over a WiFi connection of the premises.

16. A fifth-generation network (5G) test instrument comprising:
a portable power supply to supply power to an external 5G Customer Premises Equipment (CPE) antenna remote from the 5G test instrument, the 5G CPE antenna to be installed at a specific location on a premises; and
a 5G signal tester to:
measure signal strength of a 5G beam received by the 5G CPE antenna at the specific location on the premises, wherein the signal strength of the 5G beam varies depending on where the 5G CPE antenna is located on the premises; and
generate audio output having a particular tone that varies based on the varying signal strength of the 5G beam, wherein the particular tone of the audio output indicates the signal strength of the 5G beam received by the 5G CPE antenna at the specific location on the premises.

17. The 5G test instrument of claim 16, wherein the 5G signal tester is further to:
determine directional information that indicates a direction in which to move the 5G CPE antenna to align the 5G CPE antenna with the 5G beam; and
provide the directional information as a second audio output.

18. A method of measuring and audibly indicating a signal metric of a fifth-generation network (5G) beam, comprising:
measuring, by a test instrument, the signal metric of the 5G beam received by a 5G Customer Premises Equipment (CPE) antenna at a specific location on a premises, wherein the signal metric of the 5G beam varies based on a signal strength of the 5G beam depending on where the 5G CPE antenna is located on the premises;
generating, by the test instrument, an audio output having a particular tone that varies based on the signal metric of the 5G beam, wherein the particular tone of the audio output indicates the signal strength of the 5G beam received by the 5G CPE antenna at the specific location on the premises; and
transmitting, by the test instrument, the audio output having the particular tone to a speaker or a headphone device.

19. The method of claim 18, wherein the measuring of the signal metric of the 5G beam comprises measuring of the signal metric of the 5G beam for each location of a plurality of locations at which the 5G CPE antenna is to be potentially installed on the premises, and the method further comprises:
storing, by the test instrument, beam measurement information, comprising the signal metric and a location identifier, for each location of the plurality of locations; and
transmitting, by the test instrument, the beam measurement information for each location of the plurality of locations to a remote apparatus for display.

20. The method of claim 18, the method further comprising:
determining, by the test instrument, directional information that indicates a direction in which the 5G CPE antenna is moved to align the 5G CPE antenna with the 5G beam;
generating, by the test instrument, a second audio output based on the directional information; and
transmitting, by the test instrument, the second audio output to the speaker or the headphone device.

* * * * *